Sept. 14, 1965　　　J. M. KENNEDY ETAL　　　3,206,545
AUTOMATIC TELEPRINTER SYSTEM
Filed Sept. 5, 1962　　　　　　　　　　　　2 Sheets-Sheet 1

INVENTORS
J.M. KENNEDY
K.G. COLLYER
BY
J. Warren Whiteaed
ATTORNEY 3,206,545
AUTOMATIC TELEPRINTER SYSTEM
John M. Kennedy and Kervyn G. Collyer, Chicago, Ill.,
assignors to International Telephone and Telegraph
Corporation
Filed Sept. 5, 1962, Ser. No. 221,469
9 Claims. (Cl. 178—4)

This invention relates generally to automatic teleprinter systems and more particularly to systems for automatically identifying receiving teleprinters and otherwise giving general supervision over an automatic telegraph system.

It is apparent that machines are taking over the control of other machines at a rapidly accelerating rate. To accomplish this end, it is necessary that machines "talk" directly to each other, usually by some form of coded pulses. Since existing telegraph codes already provide a commonly accepted "language" of machines these machines very often "talk" through such codes.

Perhaps a specific example would highlight some of the machine-talking-to-a-machine problems. By this example, wire line connected teleprinters are located along the length of an oil pipe line. During the course of a day, the teleprinters along the pipe line must repeatedly seize and signal other teleprinters to send necessary messages. The nature of the messages is not important to the invention, they could be: personal messages, commands to automated machinery, telemeter read out or many other things. The important thing concerning this invention is that the teleprinters must properly identify each other so that messages are sent only to the correct locations. For example, imagine the havoc which would follow if a confidential personal message is sent to a public teleprinter, or an oil well is commanded to pump into a full tank. There are, of course, many other examples which could also be cited to illustrate these and other problems.

To overcome these problems, a sending teleprinter should transmit an interrogation signal and a receiving teleprinter should respond by transmitting an identification signal. The identifications signal is unique to the receiving teleprinter. Therefore, past practice has required that a uniqueness be built into each teleprinter, i.e. each teleprinter had to contain means for sending one particular code. But, this built in uniqueness increased the cost of new teleprinters and obsoleted existing teleprinters.

Accordingly, an object of this invention is to provide new and improved automatic telegraph systems and more particularly to provide for automatically identifying receiving teleprinters. In this connection, an object is to provide such automatic identification without requiring special teleprinters. Thus, an object of the invention is to adapt automatic telegraph systems to provide such identification through the use of existing teleprinter capabilities.

A further object is to provide automatic line identification, utilizing existing teleprinters yet insuring that both the line and the teleprinters are in working order.

Another object of this invention is to provide automatic telegraph switching which enables machines to "talk" directly to machines. Here an object is to eliminate the need for direct human supervision over telegraph switching without eliminating the possibility of giving such human supervision. Quite the contrary, an object is to accomplish these and other aims through the use of equipment which can be closely supervised by humans when necessary.

In accordance with one aspect of this invention, an automatic telegraph system includes a plurality of telegraph lines, each line being terminated at one end by a teleprinter and at the other end by a line circuit. A number of automatic switching links are adapted to interconnect any selected ones of the lines. After such an interconnection, the system transmits a specific, but conventional, signal and a teleprinter on a receiving line answers back by transmitting a second specific, but conventional, signal. The link equipment recognizes the second signal as a station identification and automatically generates a coded signal which identifies the receiving teleprinter. That coded signal is returned to the sending line where the teleprinter prints a record of the identification.

In accordance with another aspect of the invention, each link includes a dial controlled finder switch and connector switch combination for connecting the sending and receiving teleprinters to each other. In addition, link logic recognizes the progress of connections as they are established. At appropriate times during such progress, the link logic sends signals which cause the sending teleprinter to print supervision messages. For example, the message "DL" might mean "dial"; the message "BY" might means "busy." Other supervisory messages which may be so printed will readily occur to those skilled in the art.

The above mentioned and other features of this invention and the manner of obtaining them will become more apparent, and the invention itself will be best understood by reference to the following description of an embodiment of the invention taken in conjunction with the accompanying drawings, in which:

FIGS. 1 and 2 comprise a schematic circuit diagram which shows that portion of an automatic telegraph switching system which is required for an understanding of the invention; and FIG. 3 illustrates how FIGS. 1 and 2 are combined to form a complete drawing.

*Brief Description*

The major divisions of the drawing may be characterized as "Station A," "Station B," and "Switching Office Equipment." Each station is here shown as including a teleprinter 20, 21, a conventional telephone type dial 22, 23 and control relays 24, 25. These control relays are included in a device sometimes called "Station Boxes"; they are conventional circuits. The teleprinters could be replaced by other devices such as telemetering circuits, card or tape readers or punches, or the like.

The switching office equipment includes a link circuit 30 which may inter-connect any two teleprinters, and common equipment 31 which serves all links. In the drawing, the link circuit 30 is shown as individually connecting the sending teleprinter 20 to the receiving teleprinter 21 responsive to subscriber transmitted pulse control signals sent from dial 22. This arrangement allows a quick and easy routing which enables efficient use of transmission and switching facilities.

The common equipment 31 includes a rectifier matrix 32 and a markable distributor 33. The matrix 32 is a standard commercial product of ITT Kellogg, a division of the International Telephone and Telegraph Corporation. The markable distributor 33 is well known to those skilled in the teleprinter art. In one exemplary installation the distributor was a model 107 MT D markable distributor made by the Kleinschmidt Laboratories, Inc.

Briefly, the matrix 32 is a coordinate array of intersecting horizontal and vertical buses embedded in a plastic material. The vertical buses are matrix inputs and the horizontal buses are matrix outputs. At each intersection or crosspoint, the plastic is formed into a window which exposes the buses. In this way, dry disk rectifiers, of any suitable design, may be selectively slipped into or removed from a window. When a rectifier is in place in any window, it interconnects the buses which intersect at that crosspoint or window. Thus, any code may be selected by the simple expedient of selecting the windows into which the rectifiers are placed. For example, the drawing shows a vertical bus 34 with dry disk rectifiers in place at intersections or crosspoints 35, 36 of horizontal buses 37, 38. This means that the binary number "00011" is stored in vertical 34. Other verticals have other stored numbers.

The markable distributor 33 includes a conventional cam actuated, clutch controlled device. However, to simplify and expedite the description, the drawing shows a normally operated send relay SN controlled by a constantly rotating double ended brush 40 which sweeps over a number (here five) of contacts 41 in timed sequence. Each contact is selectively marked or unmarked by ground potential according to the code stored on an energized vertical. For example, if vertical 39 is energized only one (42) of five read relays 43 is energized. This means that only the one contact 44 of the markable distributor bank 41 is energized (i.e. from ground G1 via contacts 45). When the tip of brush 40 touches contacts 44, send relay SN releases. On all other contacts, brush 40 finds on absence of ground, and relay SN remains operated. Thus, with the five contacts 41 shown and the vertical 39 energized, relay SN contacts SN1 are closed on all except step two of the markable distributor 33. This sends the binary code "01000."

The components of the link circuit select a predetermined vertical in the matrix 32 responsive to an occurrence of an event that demands a supervision message. Thus, for example, a ready-to-dial condition may cause selection of the vertical 39, and a busy condition may cause selection of the vertical 47. This way the relay SN operates or releases, depending upon the coded connections of the diodes in the matrix, to send the signals "DL" for dial and "BY" for busy. At either the sending or the receiving teleprinter, as required, a printed message is made in accordance with the coded sequential releases and operations of relay SN.

Each line and, therefore, each teleprinter has an individual appearance in the banks B1–B4 of a connector switch. Thus, the identity of a connected teleprinter is known from the switch setting and one bank (B1) can be devoted to station identification. More particularly, on each connector switch setting, a conductor extends to an individually associated vertical in the matrix 32. For example, the drawing shows a single conductor 48 connected to the vertical 34 for identifying the teleprinter 21. Thus, if the connector switch marks conductor 48 when the markable distributor 33 operates, the relay SN sends a coded signal which identifies the receiving teleprinter.

*Detailed description*

Figure 1:
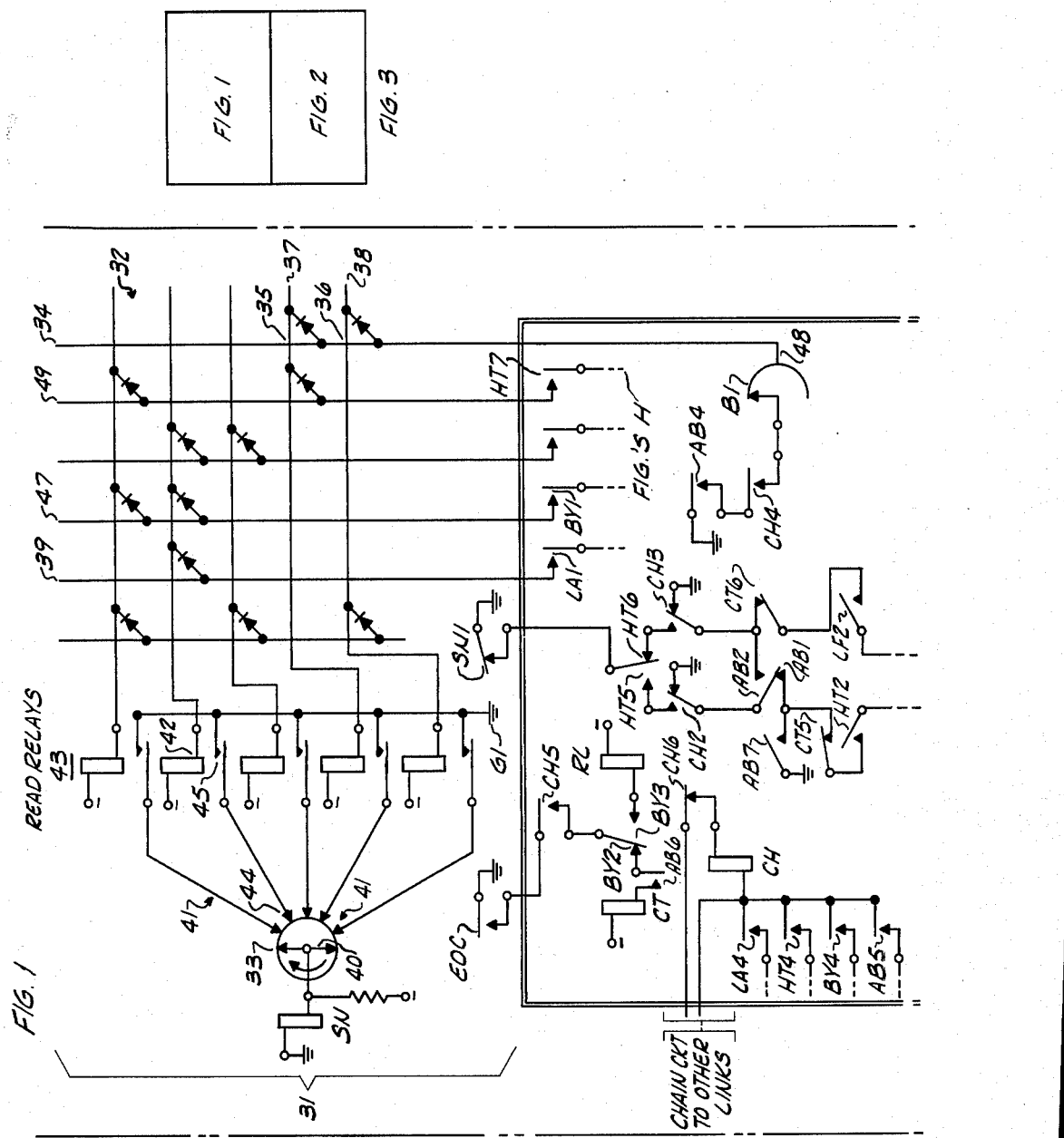
Figure 2:
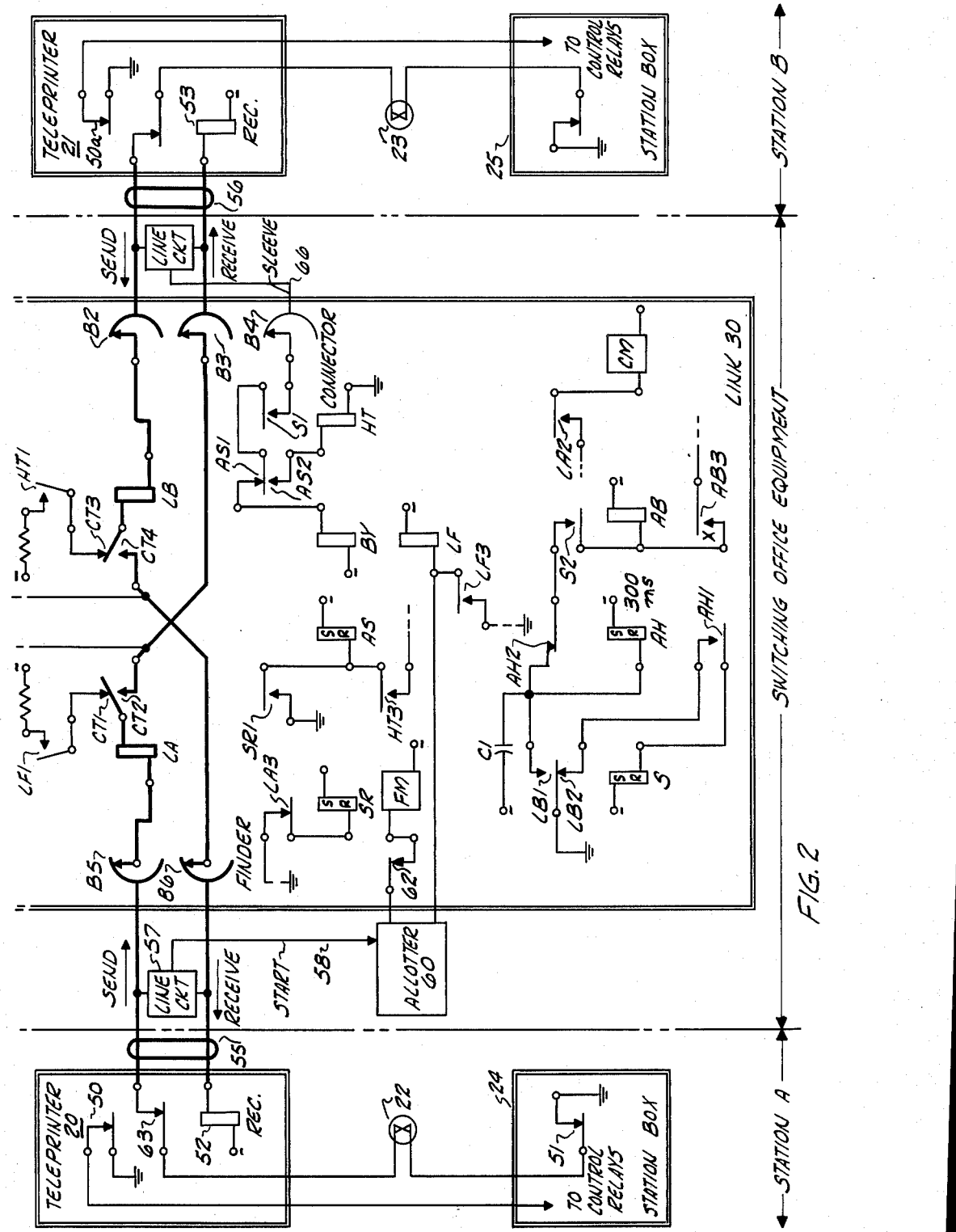

Next, the construction and operation of the system will be explained in detail. Since most of the equipment used in an automatic telegraph system is well known to those skilled in the art, the drawing is limited to the structure that actually embodies the invention. Moreover, since the construction of relays, switches and other of the components shown in the drawing are well known they will not be explained in detail either. A teleprinter (such as 20) has a typewriter keyboard, paper feed mechanism, and type face (usually mounted at the end of type bars) together with the equipment required for electrical typing operation. Each key is adapted to close a set of contacts for causing a corresponding type face to strike the paper or cause the teleprinter to perform a function such as space, line feed, etc. An exemplary one of such functions occurs upon an opening of the contacts shown at 50. When contacts 50 open and close once, control relays in station box 24 open and close transmitter contacts 51 to produce a signal which the link interprets as an "ANSWER BACK" signal. That is, the contacts 51 here transmit a coded signal comprising a 500 millisecond space, over a "SEND WIRE."

The teleprinter 20 receives signals over a "RECEIVE WIRE." For example, upon the receipt of coded signals indicating an "upper case, FIGS. H," relay 52 causes the teleprinter 20 to momentarily open and close contacts 50. This, in turn, causes the control relays 24 to open contacts 51 for the 500 millisecond interval to provide the "ANSWER BACK" signal.

By push button control, station "A" control relays 24 may also open and close contacts 51 in a predetermined manner to generate a request for service or link seizure signal.

The automatic telegraph system includes a network of lines, one of which is shown at 55 and another of which is shown at 56. Each line has a teleprinter line circuit connected to one end (as at 57). The line circuit (which is similar to a telephone line circuit) is adapted to detect the seizure signal of the teleprinter connected to the line. Thus, when contacts 51 first open, the line circuit 57 applies a start potential to a start wire 58 to request service. Any time a line is busy, the line circuit associated therewith also applys a busy marking to its sleeve conductor to guard against double seizure.

*Allotter.*—A plurality of automatic switching links are adapted to interconnect any selected one of said lines. To preselect one of these links, an allotter 60 operates before a request for connection and assigns an idle link by connecting itself to a finder magnet FM and a line found relay LF of such link.

*Link.*—Each link includes a finder switch and a connector switch. The finder comprises a rotary stepping switch having at least two banks of contacts B5, B6 and at least one drive magnet FM. The allotter 60 recognizes a potential on conductor 58 as a request for a connection and responds by energizing the magnet FM which operates and releases through its self-interrupting contacts 62. On each magnet operation, the finder brushes advance in unison one step over the banks B5, B6.

When the connection requesting line 55 is found, the alloter removes ground from magnet FM, the brushes stop, and teleprinter 20 is connected to the link 30. The allotter then operates a self-locking line found relay LF, and thereafter releases itself from the link 30 to select the next idle link and prepare for the next connection request. The line found relay LF locks at contacts LF3 and holds the connection until released from the teleprinter after the message is completely sent. The contacts LF1 close to extend the SEND WIRE through the winding of a line relay LA, which operates over the circuit from ground through contacts 51 (which opened and closed to request a connection), dial 22, contact 63, bank B5, line relay winding LA, contacts CT1 and contacts LF1 to resistance battery. The RECEIVE wires have a mark ground applied to them at normal contacts CH2, CH3 to keep the teleprinters from running open.

Means are provided for individualizing the common equipment 31 to the particular link that is ready to send. That is, line relay LA closes contacts LA4 to operate a chain relay CH, if no other link is then using the common equipment 31. If any other link is using equipment 31, contacts such as CH6 are open in that link and the chain relay CH cannot operate. When the chain relay CH operates, the contacts CH2, CH3 and others operate to complete a code signal send circuit. This way the markable distributor 33 can only transmit through one link to one line at any given time. It should be understood that the relay CH always releases at the end of a markable distributor's cycle.

*Dial.*—To give supervision for indicating that a calling subscriber may dial, line relay LA closes its contacts LA1. Ground potential is thereupon applied to the martix vertical 39. Relay 42 operates. The markable distributor scans the horizontal buses, and relay SN releases and re-operates on step two. Each time relay SN releases, contacts SN1 open and send a pulse. These pulses are coded to cause the teleprinter 20 to print "DL" which means "dial." This corresponds to the well known dial tone used in automatic telephony. The path over which the coded pulses are transmitted to teleprinter 20 extends from ground through contacts SN1, HT6, CH3, CT6, LF2, bank B6 and the receive wire to the winding of relay 52 and battery.

To seize a called line, either an operator or automatic equipment transmits dial pulses, in any suitable manner. Here a standard telephone dial 2 2is used to interrupt the ground potential applied from contacts 51 to the "SEND WIRE" via the circuit traced from ground through contacts 51, 22, 63, the SEND WIRE, bank B5, the winding of relay LA, contacts CT1 and contacts LF1 to resistance battery. Each time that the dial contacts 22 interrupt this circuit, relay LA releases and closes contacts LA2 to energize the connector drive magnet CM. Each operation of magnet CM drives the connector brushes in unison one step over banks B1-B4. Thus, the connector is driven to select and seize a particular called line 56.

*Busy test.*—The busy or idle condition of the seized line is indicated by the potential on the sleeve conductor 66. In greater detail, as is well known in automatic telephony, a series relay SR operates via contacts LA3 on a first pulse in a dial pulse train and holds (due to its own slow release characteristics) until after the last pulse in that pulse train. Then series relay SR releases. A second slow release auxiliary series relay AS operates with relay SR (via contacts SR1). Relay AS releases after a slow release period of time following the release of series relay SR. During this period of time contacts AS2 are closed and an idle or hold test relay HT operates if an idle battery is on sleeve 66. After this period of time, relay AS drops, contacts AS1 close, and a busy test relay BY operates if ground is on sleeve 66.

If the busy relay BY operates, contacts BY1 close to energize the vertical bus 47. When the markable distributor 33 operates, relay SN pulses each time the scanner brush 40 passes a terminal marked via a vertical bus 47 recitfier. The result is that the markable distributor sends and the teleprinter 20 prints the letters "BY" for busy. Also, contacts BY2 open to prevent the operation of cut-through relay CT, while contacts BY3 close to prepare for operation of the release relay RL. Contacts BY4 operate the chain relay CH if no other link is then using common equipment 31. At the end of the markable distributor scan, end of code contacts EOC close a circuit through contacts CH5, BY3 to operate release relay RL. This releases the call. Again, the chain relay CH automatically releases at the end of the markable distributor operation.

If the idle test or hold relay HT operates, contacts HT3 close to hold auxiliary series hold relay AS and thereby prevent closure of contacts AS1 and operation of the busy relay. Contacts AS2 remain closed to hold relay HT. Contacts HT1 close to operate a line relay LB. Contacts HT2 close to prepare for transmission from the markable distributor 33 to teleprinter 21. Contacts HT4 close to operate the chain relay CH if no other link is then associated with the common equipment 31.

*Identification.*—Means are provided for automatically returning to the calling teleprinter an identification of the seized teleprinter. In greater detail, upon the operation of line relay LB, contacts LB1 closed to operate relay AH. Also, capacitor C1 charges. Contacts AH2 open to disable relay AB, and contacts AH1 close to prepare relay S.

When relay HT operated, contacts HT5, HT6 operated to transfer the outpulsing circuit of the markable distributor from connection with the receive wire of line 55 to connection with the receive wire of line 56. Contacts HT7 energize vertical 49 of matrix 32. The markable distributor 33 sends any desired code to teleprinter 21 over the circuit including contacts SN1, HT5, CH2 (operated), AB1, CT5, HT2, bank B3 and line 56.

Usually the teleprinter 21 includes at least one stunt which can be made to respond to receipt at teleprinter 21 of this code stored on vertical 49 and sent over line 56. For example, the exemplary system included teleprinters which run continuously. Therefore, an unused stunt is one which conventionally turns the teleprinters "off" and "on" responsive to the receipt of an upper case letter "H" code. Thus, the code stored on vertical 49 is the upper case "H." If some other stunt were unused, the code which causes that other stunt would be stored on vertical 49.

To initiate automatic identification, the station box 25 responds to the upper case "H" signal via contacts 50a and returns a start-stop signal which is a five hundred millisecond space pulse in an exemplary system. Thus, the relay LB releases and, after five hundred milliseconds, reoperates. Responsive to this release, contacts LB1 open and relay AH holds operated for a three hundred millisecond period while capacitor C1 discharges through its winding. This period insures against release of relay AH responsive to any code shorter than a specific three hundred millisecond signal. Contacts LB2 close to operate relay S during the three hundred millisecond period while contacts AH1 are closed.

After the three hundred millisecond period measured by the discharge of capacitor C1, relay AH releases to close contacts AH2 and open contacts AH1. Relay S is also a slow release relay which holds for more than the two hundred milliseconds remaining in the five hundred millisecond space sent from the teleprinter 21. Relay LB reoperates before relay S releases. This closes the path including contacts LB1, AH2, S2 and the windings of relays AH, AB. While operating the answer back relay AB closes its "X" or preliminary contacts AB3 and locks operated. Then relay AH re-operates and opens contacts AH2.

It should be noted that the station box answer back signal must have a duration that is longer than the three hundred millisecond release time of relay AH and shorter than the combined release times of relays AH and S. Otherwise answer back relay AB will not operate. This guards against identification responsive to any except a five hundred millisecond pulse.

Responsive to the operation of the answer back relay AB, contacts AB1, AB2 operate to connect the markable distributor to the receive wire of line 55 via contacts SN1, HT5, CH2, AB2, CT6, LF2, and bank B6. Contacts AB7 hold ground or a "mark" on the RECEIVE WIRE of line 56 to prevent teleprinter 21 from running open. Contacts AB5 pull chain relay CH if no other link is then connected thereto. Contacts AB4, CH4 close to ground the wiper of identification bank B1. Depending upon the position of the connector switch, one of many terminals in bank B1 is grounded thereby energizing a selected vertical 34 in matrix 32. That vertical stores the identification of line 56. The markable distributor 33 pulses relay SN to send the stored identification over line 55 to teleprinter 20. There the identification is printed.

At the end of the markable distributor cycle occurring after contacts AB6 close, contacts EOC close to operate cut through relay CT via contacts CH5, BY2 and AB6. The cut through relay CT opens contacts CT1 to break the dial controlled circuit, and closes the contacts CT2 to complete the "SEND WIRE." In like manner, contacts CT3, CT4 operate to complete the "RECEIVE WIRE." Contacts CT5, CT6 open to disconnect the markable distributor from the line.

After the message is sent from the teleprinter 20 to the teleprinter 21 and the connection is no longer required, link 30 is released in any conventional way.

Many advantages of the invention will readily occur to those skilled in the art. For example, the receive teleprinter that is to be identified need not be specially built—it need only respond to the code stored on vertical 49. The automatic line identification does not require any modification of existing teleprinters. Any convenient code may be used; moreover, the codes returned from the matrix 32 through the markable distributor 33 may either operate machines or print out supervision messages. This eliminates the need for human supervision without eliminating the possibility of giving such human supervision.

Furthermore, the codes stored on the matrix vertical may be changed quickly and easily to modify the system response to meet changing needs. The net result is an extremely flexible transmission and switching system.

While the principles of the invention have been described above in connection with specific apparatus, it is to be clearly understood that this description is made only by way of example and not as a limitation on the scope of the invention.

We claim:

1. An automatic telegraph switching system comprising a plurality of teleprinters, a plurality of telegraph lines, each of said lines having one of said teleprinters connected to one end and a line circuit connected to the other end, switching office equipment comprising a plurality of automatic switching links for interconnecting selected one of said line circuits thereby interconnecting the teleprinters connected to said selected lines, each of said links including at least a finder and a connector switch, allotter means in each of said line circuits for operating the finder in one of said links to seize a calling one of said teleprinters and for thereafter marking said calling line busy to other links, means at each of said teleprinters for transmitting dial signals to cause the connector switch in said one link to seize a desired receiving teleprinter, means automatically operated responsive to said seizure for initiating the generation in said one link of a signal identifying the receiving teleprinter, said last named means comprising means at said receiving teleprinter for transmitting a space having a duration of approximately three hundred to eight hundred milliseconds, and means in said link operated only in response to space signals having a duration between three hundred milliseconds and eight hundred milliseconds for returning said identification signal to said calling one of said teleprinters.

2. An automatic telegraph switching system comprising a plurality of teleprinters, a plurality of telegraph lines, each of said lines having one of said teleprinters connected to one end and a line circuit connected to the other end, switching office equipment comprising a plurality of automatic switching links for interconnecting selected one of said line circuits thereby interconnecting the teleprinters connected to said selected lines, each of said links including at least a finder and a connector switch, allotter means in each of said line circuits for operating the finder in one of said links to seize a calling one of said teleprinters and for thereafter marking said calling line busy to other links, means at each of said teleprinters for transmitting dial signals to cause the connector switch in said one link to seize a desired receiving teleprinter, means automatically operated responsive to said seizure for initiating the generation in said one link of a signal identifying the receiving teleprinter, said last named means comprising a bank on said connector switch having a terminal individually associated with each of said telegraph lines, and means included in said switching office equipment for encoding signals in accordance with the selected one of said terminals to which said connector is operated.

3. The telegraph systems of claim 2 and a markable distributor, and means for connecting said markable distributor to said encoding means for selectively sending identification signals coded in accordance with the setting of said connector switch.

4. An automatic telegraph switching system comprising a plurality of teleprinters, a plurality of telegraph lines, each of said lines having one of said teleprinters connected to one end and a line circuit connected to the other end, switching office equipment comprising a plurality of automatic switching links for interconnecting selected one of said line circuits thereby interconnecting the teleprinters connected to said selected lines, each of said links including at least a finder and a connector switch, allotter means in each of said line circuits for operating the finder in one of said links to seize a calling one of said teleprinters and for thereafter marking said calling line busy to other links, means at each of said teleprinters for transmitting dial signals to cause the connector switch in said one link to seize a desired receiving teleprinter and means automatically operated responsive to said seizure for initiating the generation in said one link of a signal identifying the receiving teleprinter, said last named means comprising a bank on said connector switch having a terminal individually associated with each of said telegraph lines, a matrix having inputs and outputs for encoding signals according to the input to which said signal is applied and means for individually associating each input of said matrix with a selected one of said terminals.

5. The telegraph systems of claim 4, a markable distributor, and means for connecting said markable distributor to said output for selectively sending identification signals coded in accordance with the input marked from said selected terminal.

6. An automatic telegraph switching system comprising a plurality of teleprinters, a plurality of automatic switching links for interconnecting selected ones of said teleprinters, means in each of said links for selectively transmitting supervisory signals responsive to control operations in the establishment of a call connection, means automatically responsive to a given one of said supervisory signals for transmitting an identification of the connected receive teleprinter to a calling send teleprinter, said last named means comprising a matrix of horizontal and vertical buses having selected horizontal buses connected to selected vertical buses via crosspoint rectifiers, each of said vertical buses being connected to horizontal buses via said rectifiers in a code which represents said given one of said supervisory signals.

7. An automatic telegraph switching system comprising a plurality of teleprinters, a plurality of automatic switching links for interconnecting selected ones of said teleprinters, means in each of said links for selectively transmitting supervisory signals responsive to control operations in the establishment of a call connection, means automatically responsive to a given one of said supervisory signals for transmitting an identification of the connected receive teleprinter to a calling send teleprinter, said last named means comprising means at said receiving teleprinter for transmitting a space having a predetermined duration, and means in said link for causing said return of said identification only in response to space signals having substantially said predetermined duration.

8. An automatic telegraph switching system comprising a plurality of teleprinters, a plurality of automatic switching links for interconnecting selected ones of said teleprinters, means in each of said links for selectively transmitting supervisory signals responsive to control operations in the establishment of a call connection, means automatically responsive to a given one of said supervisory signals for transmitting an identification of the connected receive teleprinter to a calling send teleprinter, each of said links including a connector switch, said last named means comprising a bank on said connector switch having a terminal individually associated with each of said teleprinters, a matrix having inputs and outputs for encoding output signals according to the input to which a signal is applied, and means for individually associating each input of said matrix with a selected one of said terminals.

9. The telegraph systems of claim 8 and a markable distributor connected to said output for selectively sending identification signals coded in accordance with the matrix input marked from said selected terminal.

References Cited by the Examiner
UNITED STATES PATENTS

| | | | |
|---|---|---|---|
| 1,936,200 | 11/33 | Locke et al. | 178—4 |
| 2,088,750 | 8/37 | Kinkead | 178—4 |

ROBERT H. ROSE, *Primary Examiner.*